United States Patent [19]

Manin

[11] Patent Number: 5,424,999

[45] Date of Patent: Jun. 13, 1995

[54] METHOD OF OFF-SHORE SEISMIC PROSPECTING

[75] Inventor: Michel Manin, Saint Mefme, France

[73] Assignee: Compagnie Generale De Geophysique, France

[21] Appl. No.: 160,422

[22] Filed: Dec. 1, 1993

[30] Foreign Application Priority Data

Dec. 2, 1992 [FR] France ................. 92 14507

[51] Int. Cl.⁶ .................................... G01V 1/38
[52] U.S. Cl. .......................... 367/21; 367/15
[58] Field of Search ............. 367/15, 21, 24, 38

[56] References Cited

U.S. PATENT DOCUMENTS

| | | | |
|---|---|---|---|
| 4,689,821 | 8/1987 | Salikuddin et al. | 381/71 |
| 4,852,004 | 7/1989 | Manin | 364/421 |
| 4,910,716 | 3/1990 | Kirlin et al. | 367/24 |
| 4,937,794 | 6/1990 | Marschall et al. | 367/21 |
| 5,237,538 | 8/1993 | Linville, Jr. et al. | 367/38 |

FOREIGN PATENT DOCUMENTS

WO-8705404 9/1987 European Pat. Off. ...... G01V 1/36

OTHER PUBLICATIONS

Geophysics vol. 56, No. 10, Oct. 1990, Tulsa US pp. 1677–1680 D. B. Harris et al. 'Seismic noise cancellation in a geothermal field' *p. 1677, right column, line 25, p. 1678, left column, line 14*.

Journal Of The Acoustical Society Of America, vol. 87, No. 3, Mar. 1990, New York US pp. 963–975 P. A. Nelson et al., 'Active control of stationary random sound fields' *figure 1*.

Primary Examiner—Ian J. Lobo
Attorney, Agent, or Firm—Blakely, Sokoloff, Taylor & Zafman

[57] ABSTRACT

An off-shore seismic prospecting method for enabling at least two ships to prospect over a single site simultaneously, in which each of the ships generates disturbances in the off-shore environment and uses sensors to record seismic traces containing useful information concerning the geology of the subsoil. A ship is liable to constitute a point source of noise for another ship, which noise gives rise to an undesirable signal that masks said useful information. According to the invention said point source of noise is localized in three dimensions and the space-time coordinates thereof [(X'(t), Y'(t), Z(t)] during the recording is stored in terms of a frame of reference in which the space-time coordinates [(X_r(t), Y_r(t), Z_r(t)] of the sensors are also recorded, after which the recorded seismic traces are processed as a function of the space-time coordinates of the point source of noise in order to eliminate said undesirable signal.

12 Claims, 4 Drawing Sheets

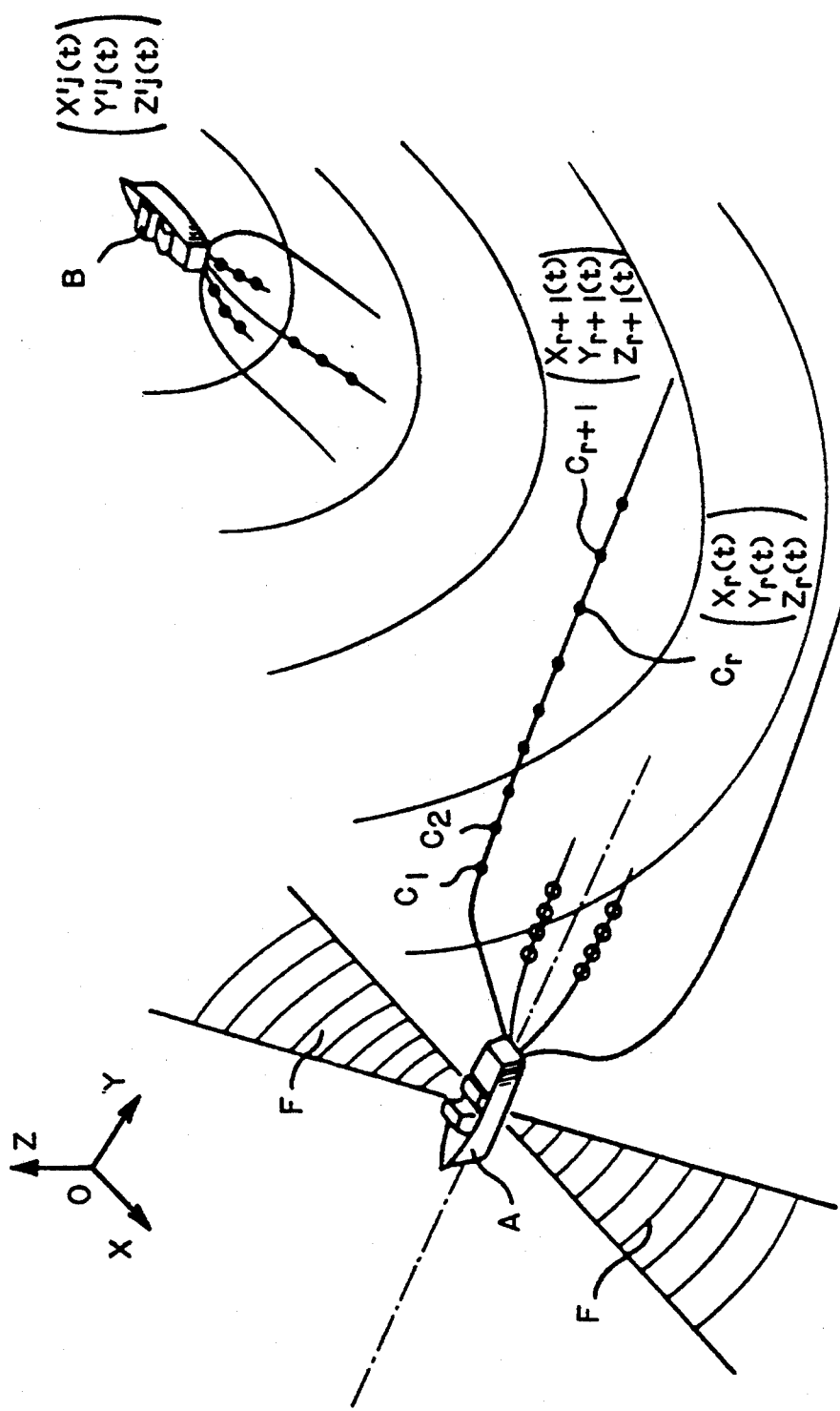

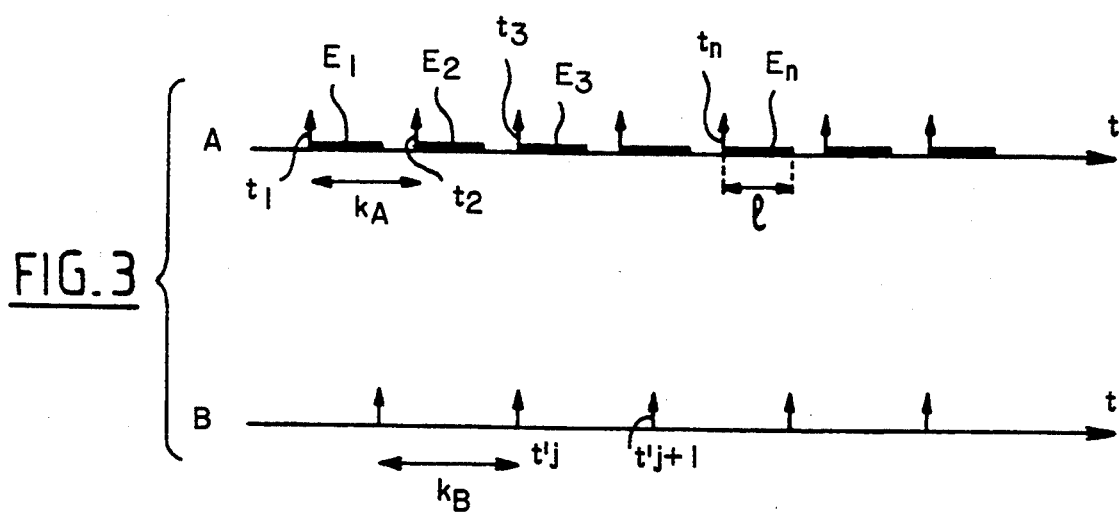
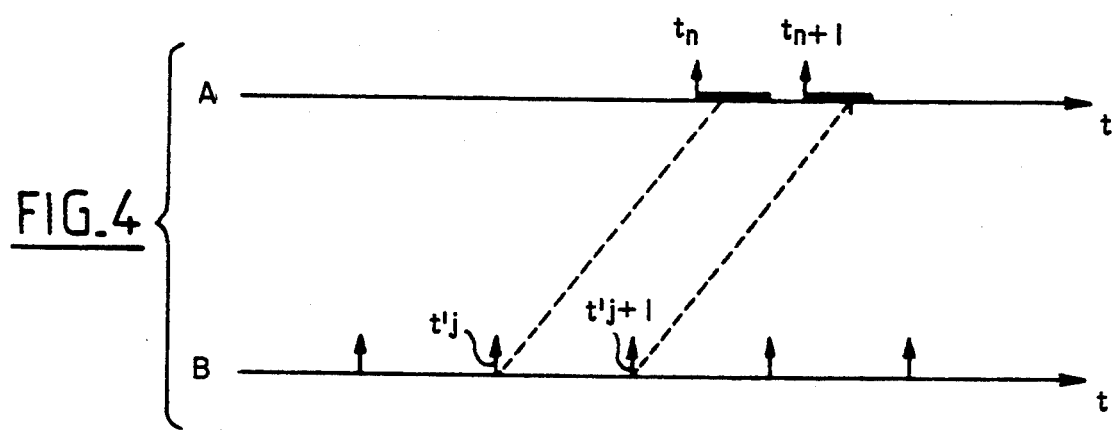
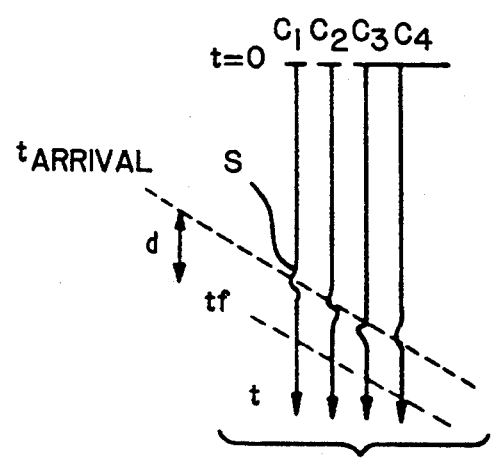

METHOD OF OFF-SHORE SEISMIC PROSPECTING

The present invention relates to geophysical prospecting using seismic methods in an off-shore environment, and it relates more particularly to a seismic prospecting method that seeks to improve the signal-to-noise ratio.

BACKGROUND OF THE INVENTION

The general principle of off-shore seismic prospecting consists in using a seismic source to give rise to a disturbance in the off-shore environment (for example by releasing a volume of air or steam into the water, by varying the volume of an immersed body, by an implosion, by a spark, etc . . . ) and in using sensors constituted by hydrophones towed by a prospecting ship or by geophones placed on the sea bed, to record seismic data for extracting useful information concerning the geology of the subsoil.

Seismic data comprises useful information (e.g. a succession of seismic reflection echoes) buried in background noise which one seeks to eliminate. The background noise is generated firstly by natural phenomena such as swell and microseisms which are random and non-localized in character, and secondly by human activity, often called "industrial noise", and that is generally localized in character.

In this latter category, the most troublesome for a prospecting ship is noise generated by a seismic disturbance caused by a second ship that is prospecting the same site, since such noise requires the first and second ships to operate in "time-sharing mode".

Pages 1677–1680 of the publication Geophysics, Vol. 56, No. 10, Oct. 1990, Tulsa, USA, discloses a method of reducing industrial noise caused by exploitation of oil deposits. That method is intended to eliminate industrial noise having a spectrum very different from that of the source used for prospecting, so it is not appropriate for eliminating disturbances due to an undesirable signal whose spectrum is close to that of the source used for prospecting, and it is therefore inapplicable to the case of two prospecting ships using seismic sources that generate disturbances having similar spectra.

Since no satisfactory method is available for eliminating industrial noise of the kind created by another prospecting ship, the ships must prospect in turn. Naturally, the period of inactivity during which a prospecting ship may not make any seismic emission has a significant effect on the cost of a prospecting campaign, thus making the cost of prospecting prohibitive in very busy areas that are rich in deposits, such as the North Sea.

SUMMARY OF THE INVENTION

The present invention provides an off-shore seismic prospecting method for enabling at least two ships to prospect over a single site simultaneously, in which each of the ships generates disturbances in the off-shore environment and uses sensors to record seismic traces containing useful information concerning the geology of the subsoil, a ship being liable to constitute a point source of noise for another ship, which noise gives rise to an undesirable signal that masks said useful information. According to an essential characteristic of the invention, said point source of noise is localized in three dimensions and the space-time coordinates thereof $[(X'(t), Y'(t), Z'(t)]$ during the recording is stored in terms of a frame of reference in which the space-time coordinates $[(X_r(t), Y_r(t), Z_r(t)]$ of the sensors are also recorded, after which the recorded seismic traces are processed as a function of the space-time coordinates of the point source of noise in order to eliminate said undesirable signal. In this way, each ship implementing the method of the invention can eliminate the undesirable industrial noise signals corresponding to the seismic shots of the other ship(s).

Preferably, when the point source of industrial noise fires pulse shots in the off-shore environment periodically at a certain period, the seismic data is recorded periodically at a period that is chosen in such a manner that the difference between the arrival instants of two successive shots is greater than the duration of a seismic data recording.

In a first implementation of the method of the invention, for a given sensor and on the basis of the coordinates of the point source and of said sensor, the arrival time at said sensor of the noise emitted by the point source is calculated, and a time window is determined on the basis of said arrival time, during which window the signal delivered by the sensor is attenuated.

In a second implementation of the method of the invention, a time shift $\Delta t_{kr}$ is applied to each of the traces, the time shift corresponding to the difference in arrival times of the noise at the sensor used for recording said trace and at the sensor used for recording a reference trace, so as to simulate synchronous arrival of the noise in the traces, a noise-elimination method is used to eliminate the undesirable signal from the traces that have been time-shifted in this way, and the inverse time shift $-\Delta t_{kr}$ is then applied to each of the denoised traces.

In a third implementation of the method of the invention, traces are processed in groups, each group being obtained by grouping together traces obtained by means of sensors that are remote from the point noise source by a given distance interval, said distance interval corresponding to a determined travel time interval of the noise, a time shift is applied to each trace in a given group so as to give the traces a new time origin constituted by the firing instant of the point noise source that disturbs said traces, which instant may optionally be offset by a constant time offset, the traces time shifted in this way are subjected to a noise elimination method, and the inverse time shift is applied to the denoised traces.

A noise-eliminating method that gives satisfaction consists in obtaining a special trace from all of the traces to be processed and in subtracting it from each of the traces to be processed. The special trace is obtained, for example, by taking the average of all of the traces to be processed. Prior to the step which consists in subtracting said special trace from each of the traces to be processed, the noise-elimination method is advantageously associated with additional processing which consists in defining a time window covering the unwanted signal on the traces to be processed, in selecting a reference trace, and in calculating within said time window and for each trace to be processed, an invertible operator such that, when convoluted with the trace under consideration, it generates the reference trace. After the said undesirable signal has been eliminated from the traces that have been subjected to said convolution operation, e.g. by subtracting a special trace therefrom (as obtained by averaging all of the traces as mentioned above, or by any other method), the traces are deconvoluted by using the inverse operator and the denoised traces are obtained therefrom.

BRIEF DESCRIPTION OF THE DRAWINGS

Other characteristics and advantages of the present invention appear on reading the following detailed description of three non-limiting implementations of the method of the invention, and on examining the accompanying drawings, in which:

FIG. 1 shows two ships prospecting the same site;

FIG. 2 shows a first implementation of the method of the invention;

FIGS. 3 to 6 show a second implementation of the method of the invention; and

MORE DETAILED DESCRIPTION

Figure 5:
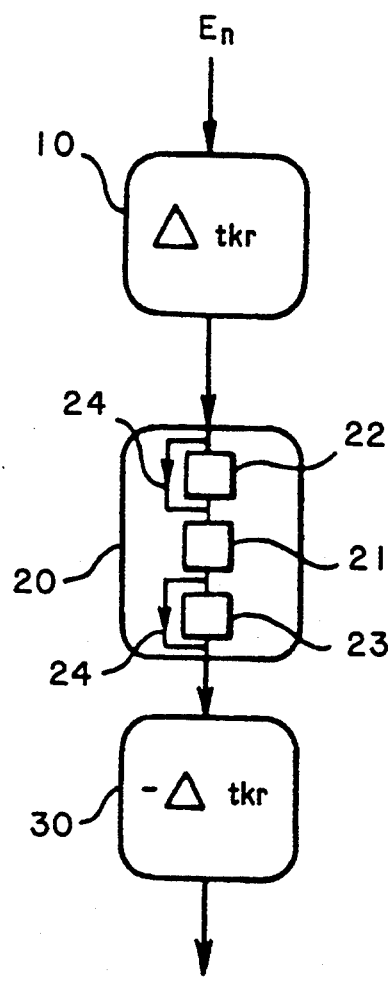

FIG. 1 shows two prospecting ships A and B each firing pulse shots into the off-shore environment and each towing lines of sensors $C_r$ suitable for receiving echoes from the pulse shots as reflected on the various geological structures in the subsoil. It is assumed below, that ship B behaves as a source of point industrial noise for ship A, with the pulse shots fired by ship B disturbing the seismic traces recorded by the sensors of ship A. The frame of reference (O, X, Y, Z) marked in FIG. 1 designates a stationary frame of reference in which the space-time coordinates of the sensors $C_r$ of ship A are $X_r(t)$, $Y_r(t)$, $Z_r(t)$, and the coordinates of the point source are $X'(t)$, $Y'(t)$, $Z'(t)$. In the example described, the sensors $C_r$ are hydrophones disposed along a pipe filled with oil and towed by the ship. Ship A includes a seismic source (not shown) that is likewise towed by the ship and may be constituted, for example, by an air gun, a steam gun, a water gun, or a sparker (all known per se). Without going beyond the scope of the invention, the hydrophones could be replaced by geophones.

In accordance with the method of the invention, ship A locates ship B and stores its space-time coordinators in a frame of reference such as the reference frame O, X, Y, Z in which the space-time coordinates of the sensors $C_r$ are also known. A different frame of reference may be used, e.g. one that is tied to ship A. To facilitate such location of ship B, a transmitter beacon is advantageously placed on ship B. Advantageously, ship A knows the instants $t_j'$ of the shots fired by ship B. In the description below, it is assumed that the point source of industrial noise, i.e. ship B, fires pulse shots into the off-shore environment periodically at a given period $k_B$ and that seismic data is recorded by ship A in periodic manner at a period $k_A$.

In a first implementation of the method of the invention, and on the basis of the coordinators of the point source B and the coordinates of a given sensor $C_r$, an estimate is made of the arrival time $t_{ARRIVAL}$ at said sensor $C_r$ of the noise emitted by the point source, and a time window is determined on the basis of said arrival time during which the signal delivered by said sensor is attenuated.

To calculate the arrival time $t_{ARRIVAL}$ at a sensor $C_r$ of a shot j fired at instant $t_j'$ by ship B, the following equation can be used:

$$t_{arrival} = t_j' + (1/V)\sqrt{[(X_r - X_j')^2 + (Y_r - Y_j')^2 + (Z_r - Z_j')^2]}$$

where:

$X_r'$, $Y_r$, and $Z_r$ designate the coordinates of the sensor $C_r$; $X_j'$, $Y_j'$, and $Z_j'$ designate the coordinates of the point source at the instant shot j was fired; and V designates the propagation velocity of seismic waves through the off-shore environment, which is assumed to be constant in this case in order to make the explanation clear.

Given the arrival time $t_{ARRIVAL}$ and the duration d of the undesirable signal due to shot j performed at instant $t_j'$ by ship B, a time window is defined between $t_{ARRIVAL}$ and $t_f = t_{ARRIVAL} + d$ during which the signal delivered by the sensor $C_r$ is attenuated. In other words, the sensor $C_r$ is "deaf" during this time window.

FIG. 2 shows an example of four traces respectively delivered by four sensors $C_1$, $C_2$, $C_3$, and $C_4$ and disturbed by shot j from ship B. The first implementation of the invention consists in taking no account or in taking reduced account (e.g. by attenuating amplitude by a factor of 10 or 100) of that portion of each trace that lies within the time window $t_{ARRIVAL}$ to $t_f$ as defined by the two parallel dashed lines in FIG. 2.

The period $k_A$ is preferably chosen so as to avoid overlap between the attenuated trace portions corresponding to two time windows that originate from the respective arrival times of two successive shots. By way of indication, the duration of the noise caused by one shot is about one second.

This first implementation of the invention has the advantage of requiring little computation time.

In contrast, there is loss of useful information contained in each time window during which a signal is attenuated.

The second implementation of the method of the invention enables this loss of useful information to be avoided.

FIGS. 3 and 4 have a time axis showing a succession of shots fired by ship A at instants $t_1$, $t_2$, $t_3$, ..., $t_n$, ... at a spacing $k_A$, said shots being followed by recording periods $E_1$, ..., $E_n$ of duration 1. The firing instants $t_j'$ of ship B are shown on a parallel time axis having the same absolute time origin, which shots are spaced at $k_B$. Each shot j fired at an instant $t_j'$ by ship B subsequently gives rise (after making allowance for propagation time through the off-shore environment) to a disturbance at a given sensor $C_r$ of ship A, during recording $E_n$ in the example of FIG. 4. The same disturbance due to shot j reaches some other sensor $C_k$ of ship A during the recording $E_n$ at time $t_i$.

The second implementation of the method of the invention includes the step that consists in applying an offset $\Delta t_{kr}$ to the trace obtained from the sensor $C_r$, which offset corresponds to the difference in arrival times at sensor $C_r$ and at sensor $C_k$ of the shot fired at instant $t_j'$ by ship B.

This offset is given by the equation:

$$\Delta t_{kr} = (1/V)\sqrt{[(X_r - X_j')^2 + (Y_r - Y_j')^2 + (Z_r - Z_j')^k]} - (1/V)\sqrt{[(X_k - X_j')^2 + (Y_k - Y_j')^2 + (Z_k - Z_j')^2]}$$

where: $X_r$, $Y_r$, and $Z_r$ designate the coordinates of the sensor $C_r$; $X_k$, Y, and $Z_k$ designate the coordinates of the sensor $C_k$; and $X_j'$, $Y_j'$, and $Z_j'$ designate the coordinates of the point source B at time $t_j'$. It may be observed that this second implementation of the invention does not require accurate knowledge of the instants at which ship B fires its shot.

Each of the traces in the recording $E_n$ is thus subjected to a time shift $\Delta t_{kr}$ corresponding to the difference in the arrival time of the noise at sensor $C_r$ used for the recording of said trace and at a sensor $C_k$ that has been used for recording a trace chosen to act as a reference, thereby simulating synchronous arrival of the noise at all of the traces. This is shown diagrammatically at step 10 in FIG. 5. The noise due to shot j from ship B then appears in conventional time-distance representations in the form of a juxtaposition of generally horizontal lines: the noise is said to be "flattened".

Thereafter, a noise-elimination method referenced by step 20 in FIG. 5 is applied to the traces that are time shifted by $\Delta t_{kr}$, after which the inverse time shift $-\Delta t_{kr}$ is applied to the denoised traces as referenced by step 30, thereby reconstituting the initial seismic data of the recording $E_n$, but without noise.

Various noise-elimination methods may be applied to the time-shifted traces.

A first method consists in obtaining a special trace from all of the traces to be processed, and in subtracting it from each of the traces to be processed. For example the special trace may be the average of the traces. This noise-elimination method is referenced by step 21 in FIG. 5. This method can be implemented directly, as represented by arrows 24.

This method is particularly suitable when the arrival of the noise in the time-shifted traces is accurately synchronized (which gives rise to mutually parallel horizontal lines that are perpendicular to the time axis on the conventional time-distance diagram).

Figure 6:
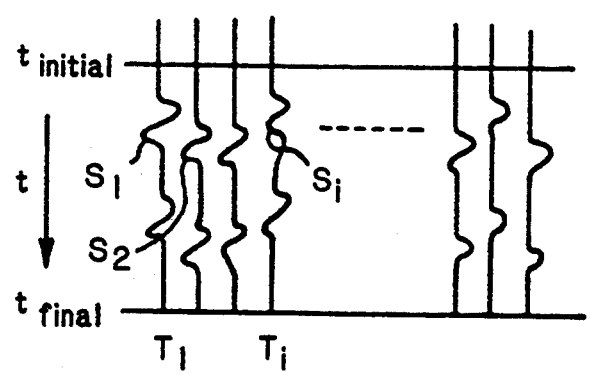

However, in practice, e.g. because of the non-uniformity of the off-shore environment and to the resulting fluctuations in propagation velocity, it can happen that the unwanted noise signals are not completely synchronous in the time shifted traces, and this is shown diagrammatically in FIG. 6. This figure shows juxtaposed traces $T_1, \ldots, T_i$ that are disturbed by non-synchronized unwanted signals $S_1, S_2, \ldots, S_i$.

In this case, it is advantageous to perform a step 22 prior to the noise-elimination step 21 of the method and to perform a step 23 after the step 21. These additional steps 22 and 23 are applied optionally in order to obtain the best results.

The additional processing corresponding to steps and 23 relies on the fact that the noise train due to the shot from ship B is strong, relatively long, and stationary.

In step 22, on the basis of knowledge of the arrival time $t_{ARRIVAL}$ of the noise at the sensors $C_r$ of ship A, a single time window overing all of the noise is defined for all of the sensors, and the following processing takes place only during said time window $t_{initial}, t_{final}$ shown in FIG. 6.

Thereafter, a reference trace is defined which may be the trace from one particular sensor, e.g. the sensor used for recording the trace $T_1$, or else any special trace obtained from the traces to be processed, e.g. a trace corresponding to the mean of traces $T_1, \ldots, T_i, \ldots$, thus giving a reference trace $T_{ref}$.

Thereafter, an invertible operator $D_i$ is calculated for each trace $T_i$ such that:

$$D_i * T_i = T_{ref}$$

where * designates the convolution operation.

Since the noise is stationary, the operator $D_i$ is advantageously simple, and in practice it is often limited to a combination of operators corresponding to a residual time shift, a phase shift relative to the reference trace, or multiplication by a scalar.

By applying the corresponding operator $D_i$ to each trace $T_i$, all of the traces become identical to the reference trace $T_{ref}$ with noise that is accurately synchronous.

The noise is then eliminated by step 21. After the noise has been eliminated, each trace is deconvoluted by using the inverse operator $D_i^{-1}$ (step 23) and the inverse time shift $-\Delta t_{kr}$ (step 30) is applied to recover the initial seismic data of the recording En, minus the noise.

This second implementation of the method of the invention performs better than the first implementation insofar as no useful information is lost, but it is nevertheless essential to ensure that ship B does not lie within a particular sector F on either side of ship A, which sector occupies about 15° on either side of the perpendicular to the seismic profile being studied by ship A. Within this particular sector, useful reflections and noise present parallel wave fronts in the time-distance diagram, thereby giving rise to a loss of useful information when implementing the above-specified noise-elimination method.

Figure 7:
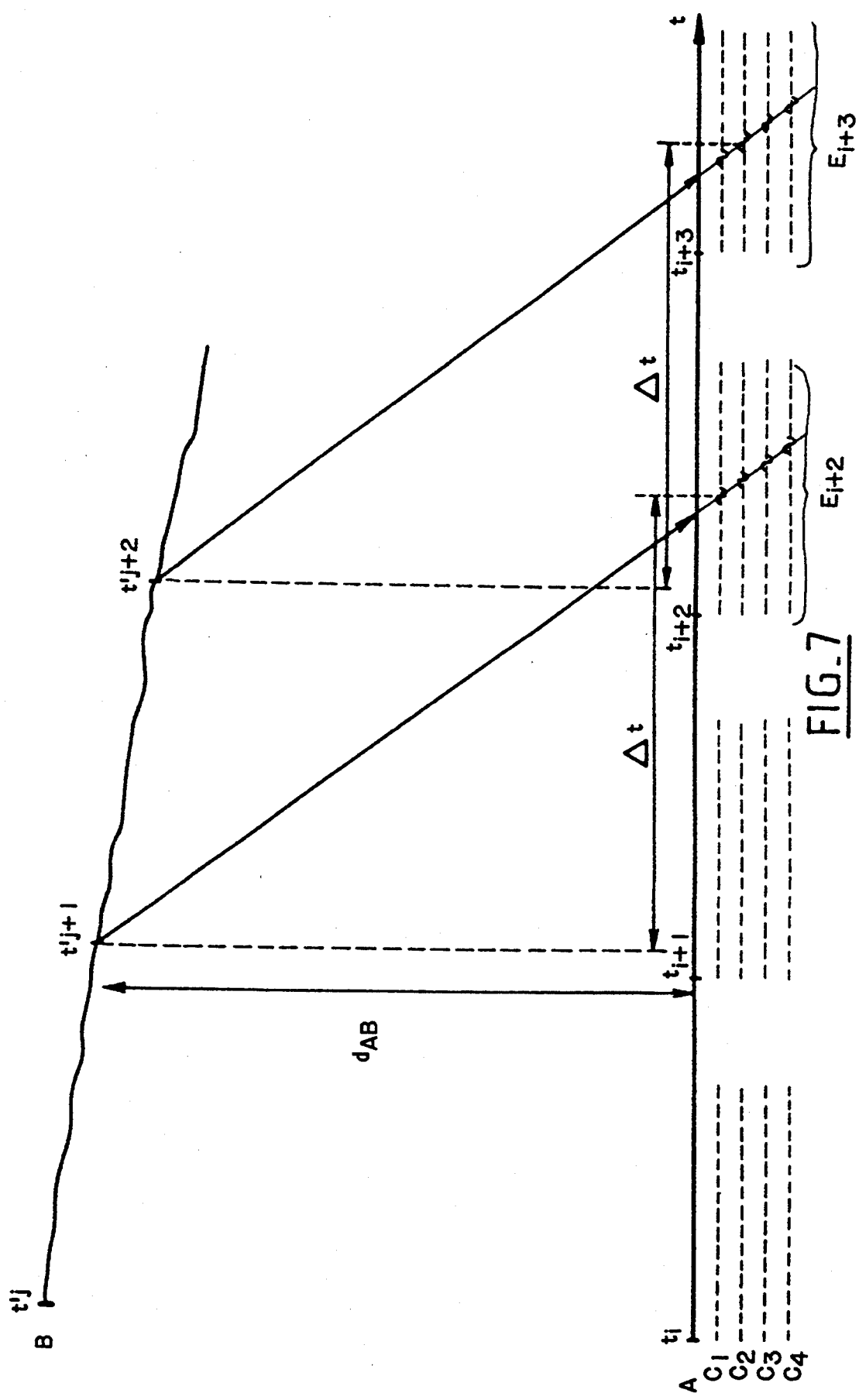

A third implementation of the invention mitigates the above drawback and enables ship A to prospect independently of the relative position of ships A and B. FIG. 7 is a diagram in which the distance $d_{AB}$ between the ships A and B is plotted as a function of time, perpendicular to the time axis. Ship B fires shots at instants $t'_j, t'_{j+1}, t'_{j+2}, \ldots$ while moving closer to ship A which is making recordings at instants $t_i, t_{i+1}, t_{1+2}, \ldots$ by means of four sensors $C_1, \ldots, C_4$. The noise due to the shot fired at instant $t'_{j+1}$ disturbs the recording that begins at instant $t_{i+2}$.

Figure 8:
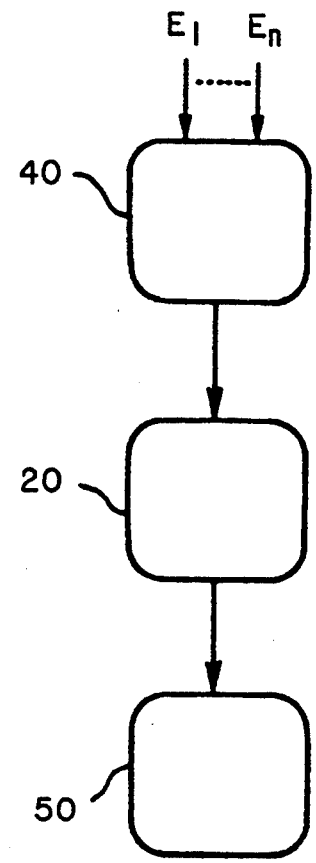
FIGS. 7 and 8 show a third implementation of the invention.

The various steps of the third implementation are shown diagrammatically in FIG. 8. Initially (step 40), groups of traces are formed, each group being obtained by grouping together traces obtained by means of sensors that are remote from ship B by a given distance interval, said distance interval corresponding to a determined travel time interval $\Delta t$ of the noise. By way of example, in FIG. 7, this given distance interval applies to sensor $C_1$ for the trace obtained during the recording $E_{i+2}$ that begins at instant $t_{i+2}$, and to sensor $C_2$ for the recording $E_{i+3}$ that begins at instant $t_{i+3}$. All of the traces of successive recordings from ship A following shots fired by ship A at instants $t_{i+1}, t_{i+2}, \ldots$, are grouped together such that:

$$\Delta t < (1/V)\sqrt{[(X_r - X_j)^2 + (Y_r - Y_j)^2 + (Z_t - Z_j)^2]} < \Delta t + a$$

where a designates a time constant that preferably lies in the range 10 ms to 20 ms.

Thereafter, on each of the traces in any given group, a time shift is performed so that the time origin of the trace becomes the firing instant of the shot fired by ship B that has disturbed this trace (instead of the firing instant of the shot fired by ship A that preceded the recording of the trace), or else the time origin used is said ship B firing instant plus or minus a constant time offset.

The arrival of the noise is thus made synchronous on the time-shifted traces so as to take by way of new time origin the instants of the shots fired by ship B that have given rise to disturbances, and a noise-eliminating method as described above can be applied to the traces shifted in this way, with this being represented by step 20 that follows step 40 in FIG. 7.

Thereafter, the reverse time shift is applied to the denoised traces so as to recover the initial seismic data minus the noise (step 50) now using an origin based on the firing instant on ship A that preceded the recording (or optionally a different instant that is offset from the ship A firing instant by a constant time offset).

The third implementation of the method of the invention assumes that the firing instants on ship B are known with sufficient accuracy, preferably to within less than 100 ms, and advantageously to within 1 ms.

The concept of a point source must be understood broadly. Two slightly separated point sources will nevertheless constitute a point source within the context of the present invention providing the travel time differences at the sensor in question are less than 200 ms.

When implementing the seismic prospecting method of the invention, ships prospecting a given site interchange their coordinates and firing instants in real time. In another implementation of the seismic prospecting method of the invention, the ships interchange data concerning their positions and their firing instants in absolute time a posteriori, and the seismic data is processed as a function of said information in deferred mode, either on site or in a computer center on land.

I claim:

1. An off-shore seismic prospecting method for enabling at least two ships to prospect over a single site simultaneously, in which each of the ships generates disturbances in the off-shore environment and uses sensors to record seismic traces containing useful information concerning the geology of the subsoil, one ship constituting a point source of noise for the other ship, which noise gives rise to an undesirable signal that masks said useful information, wherein said point source of noise is localized in three dimensions and the space-time coordinates thereof during the recording is stored in terms of a frame of reference in which the space-time coordinates of the sensors are also recorded, after which the travel time of the noise is calculated on the basis of the space-time coordinates of the point source of noise, the space-time coordinates of the sensors and the propagation velocity of seismic waves through the off-shore environment, and the recorded seismic traces are processed in order to eliminate said undesirable signal, said processing taking into account said travel time.

2. A method according to claim 1, in which the point source of noise fires pulse shots in the off-shore environment periodically at a given period, wherein the seismic data is recorded periodically at a period selected in such a manner that the difference between the arrival instants of two successive shots is greater than the duration of a seismic data recording.

3. A method according to claim 1, wherein for a given sensor and on the basis of the coordinates of the point source and of said sensor, the arrival time at said sensor of the noise emitted by the point source is calculated, and a time window is determined on the basis of said arrival time, during which window the signal delivered by the sensor is attenuated.

4. A method according to claim 1, wherein a time shift $\Delta t_{kr}$ is applied to each of the traces, the time shift corresponding to the difference in arrival time of the noise at the sensor used for recording said trace and the sensor used for recording a reference trace, so as to simulate synchronous arrival of the noise in the traces, wherein a noise-elimination method is used to eliminate the undesirable signal from the traces that have been time-shifted in this way, and wherein the inverse time shift $-\Delta t_{kr}$ is then applied to each of the denoised traces.

5. A method according to claim 4, wherein the shift $\Delta t_{kr}$ for a given trace is obtained by the equation:

$$\Delta t_{kr} = (1/V)\sqrt{[(X_r - X_j')^2 + (Y_r - Y_j')^2 + (Z_r - Z_j')^2]} - (1/V)\sqrt{[(X_k - X_j')^2 + (Y_k - Y_j')^2 + (Z_k - Z_j')^2]}$$

where: $X_r$, $Y_r$, $Z_r$ designate the coordinates of the sensor used for recording said trace; $X_j'$, $Y_j'$, and $Z_j'$ designate the coordinates of the point source that generated the undesirable signals; and $X_k$, $Y_k$, and $Z_k'$ designate the coordinates of the sensor used for recording the reference trace.

6. A method according to claim 1, wherein traces are processed in groups, each group being obtained by grouping together traces obtained by means of sensors that are remote from the point noise source by a given distance interval, said distance interval corresponding to a determined travel time interval of the noise, wherein a time shift is applied to each trace in a given group so as to give the traces a new time origin constituted by the firing instant of the point noise source that disturbs said traces, which instant may optionally be offset by a constant time offset, wherein the traces time shifted in this way are subjected to a noise elimination method, and wherein the inverse time shift is applied to the denoised traces.

7. A method according to claim 4, wherein said noise elimination method includes a step that consists in subtracting a special trace obtained from all of the traces to be processed from each of the traces to be processed.

8. A method according to claim 7, wherein said special trace is obtained by averaging the set of traces to be processed.

9. A method according to claim 7, wherein the method of eliminating noise further comprises, prior to the step of subtracting said special trace from each of the traces to be processed, the steps consisting in defining a time window that covers the undesirable signal in all of the traces to be processed and in selecting a reference trace, in calculating an invertible operator within said time window for each of the traces to be processed, the operator being such that when convoluted with the trace in question it generates the reference signal, and after eliminating said undesirable signal from the traces that have been subjected to said convolution operation, in deconvoluting the traces by using the inverse operator.

10. A method according to claim 9, wherein said invertible operator comprises at least one of the operations in the following list: phase shifting relative to the reference trace; time shifting; multiplication by a scalar.

11. A method according to claim 9, wherein the reference trace is selected from the following list: a trace selected from the set of traces to be processed; and a special trace obtained from the set of traces to be processed.

12. An off-shore seismic prospecting method for enabling at least two ships to prospect over a single site simultaneously, in which each of the ships generates disturbances in the off-shore environment and uses sensors to record seismic traces containing useful information concerning the geology of the subsoil, one ship constituting a point source of noise of the other ship, which noise gives rise to an undesirable signal that masks said useful information, wherein the ships are equipped with means for interchanging data concerning their positions and their firing instants, wherein said point source of noise is localized in three dimensions and the space-time coordinates thereof during the recording is stored in terms of a frame of reference in which the space-time coordinates of the sensors are also recorded, after which the travel time of the noise is calculated on the basis of the space-time coordinates of the point source of noise, the space-time coordinates of the sensors and the propagation velocity of seismic waves through the off-shore environment, and the recorded seismic traces are processed in order to eliminate said undesirable signal, said processing taking into account said travel time.

* * * * *